United States Patent [19]

Feay

[11] Patent Number: 4,548,991
[45] Date of Patent: Oct. 22, 1985

[54] BLENDS OF POLYCARBONATE OR POLYESTERCARBONATE WITH 4-METHYL-1-PENTENE POLYMERS

[75] Inventor: Darrell C. Feay, Orinda, Calif.

[73] Assignee: The Dow Chemical Company, Midland, Mich.

[21] Appl. No.: 493,081

[22] Filed: May 9, 1983

[51] Int. Cl.⁴ .............................................. C08L 69/00
[52] U.S. Cl. .................................. 525/146; 525/147; 524/508
[58] Field of Search ................................. 525/146, 147

[56] References Cited

U.S. PATENT DOCUMENTS

| | | | |
|---|---|---|---|
| 3,431,224 | 3/1969 | Goldblum | 525/148 |
| 3,437,631 | 4/1969 | Cleveland | 260/37 |
| 3,477,978 | 11/1969 | Holub | 260/23.7 |
| 3,801,673 | 4/1974 | O'Connell | 525/148 |
| 4,245,058 | 1/1981 | Liu | 525/148 |
| 4,427,829 | 1/1984 | Ohara | 525/67 |

FOREIGN PATENT DOCUMENTS 55-131048 10/1980 Japan.
55-133445 10/1980 Japan.
57-111351 7/1982 Japan.
58-034849 3/1983 Japan.

*Primary Examiner*—John C. Bleutge
*Assistant Examiner*—Patricia Short

[57] ABSTRACT

Polycarbonate or polyestercarbonate compositions having superior environmental stress crack resistance are obtained by blending with up to about 12 weight percent of a polymer of 4-methyl-1-pentene.

4 Claims, No Drawings

BLENDS OF POLYCARBONATE OR POLYESTERCARBONATE WITH 4-METHYL-1-PENTENE POLYMERS

BACKGROUND OF THE INVENTION

This invention relates to blends of an aromatic polycarbonate or polyestercarbonate with a 4-methyl-1-pentene polymer.

Blends of polycarbonate with a variety of polyolefins are described in the prior art. U.S. Pat. No. 3,431,224 discloses blends of polyethylene, polypropylene, polyisobutylene, a copolymer of ethylene and an alkyl acrylate or a copolymer of ethylene and propylene. U.S. Pat. No. 3,477,978 describes blends of an aromatic polycarbonate with a polymer of an olefin of 2-3 carbon atoms. Protective body armor fabricated from a polycarbonate and 3 to 7 percent of a polyolefin is claimed in U.S. Pat. No. 3,437,631. A process for preparing a blend of an olefin polymer and a polycarbonate is described in U.S. Pat. No. 3,801,673.

U.S. Pat. No. 4,245,058 teaches that ternary blends of aromatic polycarbonates, an acrylate copolymer and a polyolefin are thermoplastic compositions possessing improved impact strength. The polycarbonates employed in these blends also can contain ester moieties. The Japanese Patent Application No. 55-090,550, published July 9, 1980, also describes blends of polyestercarbonates and certain polyolefins.

The prior art blends of polycarbonate and polyolefin exhibit some improvement in impact strength relative to polycarbonate alone, particularly at below ambient temperatures of after exposure to high temperatures. However, relatively little improvement is imparted by these blends in the capacity of the thermoplastic to withstand exposure to organic solvents without failure under stress. This property is frequently referred to as "environmental stress crack resistance". The Izod impact strength of these blends also declines following extended exposure to water. Accordingly, it would be desirable to identify blends of polycarbonates which exhibit greater environmental stress crack resistance and improved strength after exposure to water.

SUMMARY OF THE INVENTION

In accordance with the present invention, novel, normally-solid blends of at least one aromatic carbonate polymer with from about 2 to about 12 percent by weight of an addition polymer of 4-methyl-1-pentene per hundred parts of aromatic polycarbonate and polyestercarbonate are disclosed. The polymer of 4-methyl-1-pentene can be a homopolymer or can be prepared by addition polymerization of 4-methyl-1-pentene with up to about 15 mole percent of some other alpha-olefin monomer. The term "normally-solid" is meant to denote that these blends are generally solids at ambient temperatures in the absence of solvents.

The subject blends exhibit improved environmental stress crack resistance relative to polycarbonate blends with high-density polyethylene containing the same percentage of polyolefin. This improvement is especially noticeable in the presence of gasoline or solvents of similar composition. The subject blends also exhibit an Izod impact strength of at least about 5.0 foot-pounds per inch notch when tested in accordance with ASTM D-256 after immersion in 100° C. water for 1000 hours.

Detailed Description of the Invention

Polymer of 4-Methyl-1-Pentene

Polymers of 4-methyl-1-pentene are well known in the prior art. U.S. Pat. Nos. 2,957,225, 3,969,333, 3,969,335 and 4,342,854 describe methods of making such polymers and are incorporated herein by reference. These polymers are also available commercially from Mitsui Petrochemical Industries, Ltd. These polymers are essentially linear and are prepared by predominantly 1,2-polymerization. In contrast, U.S. Pat. No. 3,317,500 teaches a method of preparing a cross-linked polymer from 4-methyl-1-pentene by predominantly 1,4-polymerization of the monomer, which is not desirable in the subject blends.

The polymers are advantageously essentially homopolymers, but minor amounts of other alpha-olefins having 2 to 12 carbons can also be employed in preparing these polymers. Preferred comonomers are straight-chain alpha-olefins having from 4 to 10 carbon atoms, more preferably 5 to 7 carbon atoms. Any olefin present in addition to 4-methyl-1-pentene should not be present in quantities which significantly disrupt the crystallinity of the polyolfin, inasmuch as a polyolefin having a percent crystallinity of at least about 10 percent, more preferably at least about 30 percent, is preferred. The percent crystallinity is conveniently determined by the use of X-ray diffraction techniques known in the art.

In general, it is preferred for the polyolefin to contain at least 85 mole percent moieties derived from 4-methyl-1-pentene, more preferably at least about 90 mole percent, most preferably at least about 95 mole percent. In some embodiments it is desirable to copolymerize with a minor amount (about 2 to about 10 mole percent) of a $C_4$ to $C_{10}$ alpha-olefin in order to reduce formation of voids, as described by Clark and Palmer, *The Chemistry of Polymerization Processes*, Monograph No. 20, Society of the Chemical Industry, London, England, 1966, pp. 82–103.

Polycarbonate or Polyestercarbonate

The aromatic polycarbonates and aromatic polyestercarbonates (hereinafter, "carbonate polymers") employed as components in the subject blends are compounds well known in the prior art. Mixtures of two or more of these components can also be employed.

The carbonate polymers both contain a plurality of repeating units corresponding to the formula I

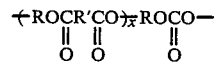

wherein each R is independently aromatic hydrocarbylene or inertly-substituted aromatic hydrocarbylene, each R' is independently meta- or para-phenylene and x is a number from 0 to 10. Where x=0, the compound is a polycarbonate.

For the purposes of this invention, an "aromatic hydrocarbylene" is a divalent radical containing at least one aromatic moiety. Preferably, two aromatic moieties are present and each aromatic moiety bears one of the valences. More preferably, the aromatic moieties are phenylene. The two aromatic moieties can be linked by

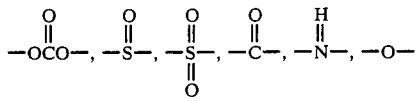

or a chemical bond. Preferably, the aromatic moieties are joined by an alkylene or alkylidene group optionally bearing a phenyl substituent. An "inertly substituted" group is one having one or more substituents other than hydrogen, said substituents being inert in the blended composition and during the preparation of the composition.

The preparation of various polycarbonates is described in U.S. Pat. Nos. 2,999,835, 3,038,365, 3,334,154, 4,108,750, 4,123,436 and 4,131,575. The aromatic polycarbonate is conveniently prepared by reaction of a dihydric phenol with phosgene or a phosgene precursor. Preferred as dihydric phenols are bisphenol A, bis-(4-hydroxyphenyl)methane, 1,1-bis-(4-hydroxyphenyl)ethane and phenolphthalein. Most preferred is bisphenol A.

A minor amount of a polyhydric phenol can also be employed to prepare a branched polycarbonate for use in this invention. See U.S. Pat. No. 4,001,184. The polycarbonate should not be highly cross-linked. However, generally it is preferred that the polycarbonate component is essentially linear.

The polyestercarbonates which can be used herein can also be prepared by a variety of methods taught in the prior art. U.S. Pat. Nos. 4,260,731, 4,255,556, 4,156,069 and 4,105,633 describe polyestercarbonate copolymers and methods of making them and are incorporated herein by reference. U.S. Pat. No. 3,169,121 teaches a method for preparing a block polyestercarbonate containing a preponderance of carbonate moieties. Ordered polyestercarbonates are in general the preferred polyestercarbonates for use in the subject blends. Particularly preferred are the polyestercarbonates claimed in U.S. Pat. No. 4,330,362.

The group represented by "R" in formula I is preferably derived from a dihydric phenol, such as, for example, 2,2-bis-(4-hydroxyphenyl)propane (i.e., bisphenol A), bis-(4-hydroxyphenyl)methane, 1,1-bis-(4-hydroxyphenyl)ethane and phenolphthalein. Most preferably, "R" is derived from bisphenol A. The preferred ratio of ester to carbonate groups in the polyestercarbonate is from about 1:1 to about 4:1.

Particularly preferred as a polyestercarbonate component of the blend are ordered copolymers made up of repeating units corresponding to forumla I wherein the molar ratio of para-phenylene to meta-phenylene in the groups represented by R' is in the range from 0.95:0.05 to 0.05:0.95 and x is a number from 0.05 to 10. More preferably the molar ratio of para- to meta-phenylene is in the range from 0.9:0.1 to 0.5:0.5, most preferably about 0.8:0.2. The Izod impact resistance at ambient temperatures (determined in accordance with ASTM D-256) and the processability of the blend generally increases with increasing amounts of meta-phenylene in the copolymer. The heat distortion, low temperature impact resistance and fatigue resistance generally increase as the para-phenylene present in the copolymer increases, while notch sensitivity and thickness sensitivity generally decreases.

Polycarbonates or polyestercarbonates having a weight average molecular weight of at least 25,000 grams per mole, more preferably from about 28,000 to about 33,000, are preferred. The molecular weight is conveniently determined by gel permeation chromatography using a bisphenol-A polycarbonate for calibration. Where a polycarbonate or polycarbonate having a molecular weight lower than about 25,000 is employed, the physical properties of the blend may be deleteriously affected.

More than one polycarbonate or polyestercarbonate and mixtures thereof can be employed in the subject blends. Particularly preferred are blends like those described in U.S. patent application Ser. No. 307,135, filed Sept. 30, 1981, which is incorporated herein by reference. Blends having a predominant amount of polycarbonate have been observed to undergo the greatest improvement in properties on blending with the 4-methyl-1-pentene polymer. Especially preferred as carbonate polymers are blends of a polycarbonate and polyestercarbonate having an overall ratio of ester-to-carbonate groups in the range from about 3:7 to about 1:2.

Other Components

Other components can be incorporated into the polymer blend to improve specific properties of the blend. For example, fire retardants, plasticizers, mold release agents, thermal stabilizers and U.V. light stabilizers can all be used to advantage. Generally, these other components are used in small, but effective amounts so as to minimize deleterious effects on the properties of the blend.

Blending

The components of the subject compositions can be blended by any technique which effects intimate intermixing of components without significant mechanical or thermal degradation of the polymer components. For example, the components can be dissolved or dispersed in a compatible diluent, blended together to produce a homogeneous dispersion or solution and the diluent removed.

The preferred method for blending the polymer components is in an extruder at a temperature and shear rate which will effect intimate mixing without significant polymer degradation. Generally, temperatures in the range from about 250° to about 370° C. are suitable. An extruder temperature of at least 285° C. is preferred when component polymers having high softening temperatures are employed.

Properties

The blends of polycarbonate with a polymer of 4-methyl-1-pentene when compared with polycarbonate alone exhibit improved Izod impact strength, particularly at subambient temperatures, when a sharp notch is employed or after exposure to temperatures of about 100° C. for an extended period of time (i.e., heat aging). The tensile strength and Vicat heat distortion of the blend typically decrease with an increasing percentage of polyolefin. The hydrolytic stability of a polycarbonate containing the poly(4-methyl-1-pentene) is vastly superior to polycarbonate alone and significantly better than that of a polycarbonate containing a like quantity of polyethylene. The improvement in hydrolytic stability is most prominent in water having a temperature of at least about 90° C. The environmental stress crack resistance (ESCR) of the subject blends, especially in gasoline and similar solvents, is markedly superior to both polycarbonate and blends of polycarbonate and most polyolefins known in the prior art. This improvement is particularly noticeable at a tensile stress of at least about 2000 psi.

The subject blends containing a substantial quantity of polyestercarbonate, i.e., an overall ratio of ester to carbonate moieties of at least 1:20, show improvement in the same properties as blends of polycarbonate and polymers of 4-methyl-1-pentene. However, as many polyestercarbonates already possess hydrolytic stability and ESCR superior to polycarbonate, the improvement in properties attained by the addition of poly(4-methyl-1-pentene), though significant, is not as great as in the case of polycarbonate.

The polycarbonate or polyestercarbonate blends exhibiting the best overall combination of properties are in general those containing from about 2 to about 10 weight percent of a 4-methyl-1-pentene polymer, more preferably from about 3 to about 8 weight percent, most preferably about 4 to about 6 weight percent.

The following examples are presented to illustrate the invention. Unless otherwise indicated, all parts and percentages are by weight.

General Preparation of Blends Used in Examples

A bisphenol A polycarbonate sold by Mobay Chemical Company under the designation MERLON M50 polycarbonate was dry blended with a quantity of polyolefin to prepare a mixture containing a specific percentage of polyolefin. The resulting mixture was dried at 95° C. for 4 hours and extruded at a melt temperature of 275° C. using a two-stage, single-screw Killion extruder having a three-fourths inch screw diameter with a length:diameter ratio of 24:1.

The extruded strand was pelletized and dried at 125° C. for four hours. The pellets were then injection molded at a melt temperature of 290° C. and a mold temperature of 65° C. to make specimens suitable for physical property testing.

In some illustrative examples of this invention presented hereinafter a polyestercarbonate (prepared as described in U.S. Pat. No. 4,330,662) was melt blended with the polycarbonate prior to dry blending with the polyolefin. The polyestercarbonate component had an ester-to-carbonate ratio of 3:1 and a ratio of paraphenylene to meta-phenylene moieties of 4:1. The resulting polycarbonate/polyestercarbonate blend had an overall ester-to-carbonate group ratio of 1:5.7.

EXAMPLE 1-5

Comparative Experiments A-C

Specimens of a blend of a bisphenol A polycarbonate containing 2,4,5,7 or 10 weight percent of a 4-methyl-1-pentene polymer (PMP) sold by Mitsui Petrochemical under the name TPX-810 resin were immersed in refluxing (100° C.) water. The TPX-810 resin is believed to be a copolymer containing minor (about 5 weight percent) amounts of other olefin monomers. Periodically specimens were removed from the water and the specimens were notched (7.5 mm notch radius). The Izod impact strength (in foot-pounds/inch) of the notched specimens was then determined in accordance with ASTM D-256-81, a standard test method promulgated by the American Society for Testing Materials.

In comparative experiments, specimens of the polycarbonate itself and polycarbonate blended with 5 weight percent of a commercial polypropylene (PP) or high-density polyethylene (HDPE) were immersed in refluxing water. The Izod impact strength of these comparative specimens was tested in accordance with ASTM D-256-81.

The test results were compiled in Table I. The polycarbonate blends with PMP exhibit unexpected hydrolytic stability relative to polycarbonate alone or blends with HDPE. The blends with polypropylene also exhibited good hydrolytic stability.

TABLE I

| | Polyolefin (Wt. %) | Izod Impact Strength Hours Water Immersion | | | | | | |
|---|---|---|---|---|---|---|---|---|
| | | 0 | 25 | 250 | 500 | 1000 | 1250 | 1500 |
| Example | | | | | | | | |
| 1 | PMP (2%) | 14.7 | * | 10.8 | 8.2 | 8.5 | * | * |
| 2 | PMP (4%) | 13.9 | * | 13.2 | * | * | 7.9 | * |
| 3 | PMP (5%) | 14.1 | * | 11.5 | 11.7 | * | * | 10.3 |
| 4 | PMP (7%) | 11.7 | * | 10.3 | * | * | 8.5 | * |
| 5 | PMP (10%) | 11.3 | * | 8.3 | 8.9 | 8.3 | * | * |
| Comp. Exp.** | | | | | | | | |
| A | None | 19.0 | 2.6 | * | * | * | * | * |
| B | HDPE (5%) | 13.5 | 13.0 | 9.6 | 7.0 | 2.5 | * | * |
| C | PP (5%) | 14.4 | 11.8 | * | * | * | * | 10.4 |

*No impact strength determined.
**No embodiments of this invention.

EXAMPLES 6-8

Comparative Experiments D-F

In a manner otherwise similar to Example 1, the hydrolytic stability of a blend of polycarbonate and a polyestercarbonate (ester-to-carbonate ratio=1:5.7) containing 2,5 or 10 weight percent PMP was tested for hydrolytic stability in refluxing water. Comparative experiments were conducted with polycarbonate/polyestercarbonate blend alone, as well as with HDPE and polypropylene. The results are tabulated in Table II.

The blends containing PMP exhibited unexpected hydrolytic stability when compared with the polycarbonate/polyestercarbonate alone, as well as blends with polypropylene or HDPE.

TABLE II

| | Polyolefin (Wt. %) | Izod Impact Strength Hours Water Immersion | | | | | |
|---|---|---|---|---|---|---|---|
| | | 0 | 100 | 250 | 500 | 1000 | 1500 |
| Example | | | | | | | |
| 6 | PMP (2%) | 12.8 | * | 11.2 | 11.8 | 6.8 | * |
| 7 | PMP (5%) | 13.0 | 11.1 | 13.0 | 10.5 | 13.0 | 8.7 |
| 8 | PMP (10%) | 9.5 | * | 8.3 | 8.0 | 7.1 | * |
| Comp. Exp.** | | | | | | | |
| D | None | 17.1 | 2.2 | * | * | * | * |
| E | HDPE (5%) | 12.6 | 9.9 | 8.5 | 5.4 | 1.3 | * |
| F | PP (5%) | 11.7 | * | 10.3 | * | 6.7 | 2.9 |

*No impact strength determined.
**Not embodiments of this invention.

EXAMPLES 9-11

Comparative Experiments G-L

Specimens molded from blends of polycarbonate and PMP like those immersed in refluxing water in Examples 1, 3 and 5 were tested to determine environmental stress crack resistance. Certain comparative polycarbonate compositions were also tested. The environmental stress crack resistance (ESCR) of the resins was measured using the technique described by R. A. Bubeck et al, Poly. Eng. Sci., 21 624 (1981). An injection molded speciman 0.125 inch thick×0.500 inch wide×4.0 inches long with a curved stress concentrator milled into it (6.4 mm radius) on each side and directly opposite one another was mounted in an environmental containment fixture and a tensile load of 2000, 2500 or 3000 psi (pounds per square inch) was applied after the solvent mixture was introduced into the containment fixture. A solvent mixture of 75 vol. % isooctane and 25 vol. % toluene was used. This mixture is similar in action to gasolene but more consistent in composition. The time to failure of the specimen was measured and results are tabulated in Table III.

The blends with PMP exhibit an environmental stress crack resistance clearly superior to blends containing the identical weight percent polypropylene. Blends with 5 weight percent PMP are also superior in ESCR to blends with the same percentage of HDPE. Blends containing 10 weight percent HDPE provide superior ESCR, but hydrolytic stability and physical properties, such as tensile strength and heat distortion temperature suffer.

TABLE III

| | Polyolefin (Wt. %) | Minutes to Failure at Given Stress (psi) | | |
|---|---|---|---|---|
| | | 2000 | 2500 | 3000 |
| Example | | | | |
| 9 | PMP (2%) | 97 | 18 | 13 |
| 10 | PMP (5%) | 225 | 108 | 22 |
| 11 | PMP (10%) | 65 | 31 | 17 |
| Comp. Exp.** | | | | |
| G | None | 49 | 27 | 8 |
| H | HDPE (5%) | 87 | 22 | 8 |
| J | HDPE (10%) | 416 | 68 | 32 |
| K | PP (5%) | 60 | 37 | 14 |
| L | PP (10%) | 46 | 16 | — |

**Not embodiments of this invention.

EXAMPLE 12

Comparative Experiments M-O

The environmental stress crack resistance of compositions identical to those immersed in refluxing water and tested for hydrolytic stability in Example 7 and Comparative Experiments D, E and F are tested in the manner described in Examples 9–11. The results are tabulated in Table IV. The environmental stress crack resistance of the subject blends is consistently superior to that of the blends tested for comparison.

TABLE IV

| | Polyolefin (Wt. %) | Minutes to Failure at Given Stress (psi) | | |
|---|---|---|---|---|
| | | 2000 | 2500 | 3000 |
| Example | | | | |
| 12 | PMP (5%) | 414 | 80 | 26 |
| Comp. Exp.** | | | | |
| M | None | 90 | 31 | 13 |
| N | HDPE (5%) | 108 | 24 | 14 |
| O | PP (5%) | 235 | 37 | 19 |

**Not embodiments of the invention.

EXAMPLES 13–17

Comparative Experiments P-T

The Izod impact strength (in foot-pounds/inch) of blends of polycarbonate and PMP were tested in accordance with ASTM-256-81 at 23° and −30° C. using a 10 mil notch radius. Tensile strengths at yield were determined for samples of the same composition using methods described in ASTM D-638. These same tests were conducted on other compositions for purpose of comparison. The results are compiled in Table V.

TABLE V

| | Polyolefin (Wt. %) | Izod Impact Strength | | Tensiles at Yield | |
|---|---|---|---|---|---|
| | | 23° C. | −30° C. | Stress (psi) | Strain (%) |
| Example | | | | | |
| 13 | PMP (2%) | 14.7 | 3.7 | 8360 | 6.2 |
| 14 | PMP (4%) | 13.9 | 8.0 | 8200 | 6.0 |
| 15 | PMP (5%) | 14.1 | 9.3 | 7960 | 6.2 |
| 16 | PMP (7%) | 11.7 | 7.4 | 7830 | 5.8 |
| 17 | PMP (10%) | 11.3 | 8.2 | 7650 | 5.6 |
| Comp. Exp.** | | | | | |
| P | None | 19.0 | 3.2 | 8470 | 6.6 |
| Q | HDPE (5%) | 13.5 | 7.8 | 7980 | 6.5 |
| R | HDPE (10%) | 10.5 | 5.2 | 7020 | 5.6 |
| S | PP (5%) | 14.4 | 11.6 | 8100 | 6.8 |
| T | PP (10%) | 11.5 | 6.5 | 7280 | 5.6 |

**Not an embodiment of this invention.

EXAMPLES 18–20

Comparative Experiments U-W

The Izod impact strength and tensile strength of melt-blended polycarbonate/polyestercarbonate (ester-to-carbonate group ratio 1:5.7) blended with PMP was determined in the manner of Example 13. Tests of comparative blends were also conducted. The results are compiled in Table VI.

TABLE VI

| | Polyolefin (Wt. %) | Izod Impact Strength | | Tensiles at Yield | |
|---|---|---|---|---|---|
| | | 23° C. | −30° C. | Stress (psi) | Strain (%) |
| Example | | | | | |
| 18 | PMP (2%) | 12.8 | 7.1 | 8620 | 6.5 |
| 19 | PMP (5%) | 13.0 | 10.1 | 7980 | 6.1 |
| 20 | PMP (10%) | 9.5 | 7.6 | 7680 | 5.6 |
| Comp. Exp. | | | | | |
| U | None | 17.1 | 12.7 | 8630 | 6.2 |
| V | HDPE (5%) | 12.6 | 9.4 | 8080 | 6.6 |
| W | PP (5%) | 11.7 | 7.4 | 8140 | 6.4 |

What is claimed is:

1. A normally-solid blend of at least one aromatic carbonate polymer with a polyolefin comprising about 2 to about 12 percent by weight of an addition polymer of 4-methyl-1-pentene per hundred parts of aromatic carbonate polymer, said addition polymer being prepared by the homopolymerization of 4-methyl-1-pentene or by copolymerization of 4-methyl-1-pentene with up to about 15 mole percent of other olefin monomers and said aromatic carbonate polymer has a weight average molecular weight of at least 25,000 and consists of a plurality of repeating units corresponding to the formula

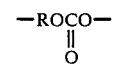

wherein each R is independently aromatic hydrocarbylene or inertly substituted aromatic hydrocarbylene, with the proviso that the resulting blend exhibits an Izod impact strength of at least about 5.0 foot-pounds per inch notch when tested in accordance with ASTM D-256 following immersion in 100° C. water for 1000 hours.

2. The blend as described in claim 1 wherein the carbonate polymer is derived from bisphenol A, bis-(4-hydroxyphenyl)methane, 1,1-bis(4-hydroxyphenyl)ethane or phenolphthalein.

3. The blend as described in claim 2 wherein the carbonate polymer is a polycarbonate of bisphenol A.

4. The blend as described in claim 2 wherein the addition polymer of 4-methyl-1-pentene is made from no more than 10 weight percent of other olefin monomers.

* * * * *